(12) United States Patent
Metzner et al.

(10) Patent No.: US 9,495,317 B2
(45) Date of Patent: Nov. 15, 2016

(54) BUS DRIVER CIRCUIT WITH IMPROVED TRANSITION SPEED

(71) Applicant: Infineon Technologies AG, Neubiberg (DE)

(72) Inventors: Dieter Metzner, Eichenau (DE); Peter Widerin, Hoerbranz (AT); David Astrom, Feffernitz (AT)

(73) Assignee: Infineon Technologies AG, Neubiberg (DE)

( * ) Notice: Subject to any disclaimer, the term of this patent is extended or adjusted under 35 U.S.C. 154(b) by 379 days.

(21) Appl. No.: 14/132,831

(22) Filed: Dec. 18, 2013

(65) Prior Publication Data

US 2015/0169488 A1 Jun. 18, 2015

(51) Int. Cl.
*G06F 13/00* (2006.01)
*G06F 13/40* (2006.01)

(52) U.S. Cl.
CPC ..... *G06F 13/4022* (2013.01); *G06F 2211/002* (2013.01)

(58) Field of Classification Search
CPC .................................................. G06F 13/4022
USPC ......................................................... 710/316
See application file for complete search history.

(56) References Cited

U.S. PATENT DOCUMENTS

| 6,362,667 | B2 | 3/2002 | Killat et al. |
| 6,664,821 | B2 * | 12/2003 | De Haas ............... H04L 25/028 |
| | | | 326/30 |
| 7,888,969 | B2 | 2/2011 | Metzner et al. |
| 2010/0201399 | A1 | 8/2010 | Metzner et al. |
| 2014/0330996 | A1 * | 11/2014 | de Haas ............. G06F 13/4031 |
| | | | 710/106 |

\* cited by examiner

*Primary Examiner* — Chun-Kuan Lee
(74) *Attorney, Agent, or Firm* — Shumaker & Sieffert, P.A.

(57) ABSTRACT

A bus driver circuit may include a first and a second circuit node, wherein the first circuit node is operably coupled to a bus line, which causes a bus capacitance between the first and the second circuit node. A switching circuit is coupled to the first circuit node and configured to apply an output voltage between the first and the second circuit node. Thereby the bus capacitance is charged when a control signal indicates a dominant state. A discharge circuit comprises at least one resistor. The discharge circuit is coupled between the first and the second circuit node and configured to allow the bus capacitance to discharge via the resistor when the control signal indicates a recessive state. The switching circuit is further configured to provide a temporary current path for discharging the bus capacitance during a transition period from a dominant to a recessive state.

17 Claims, 5 Drawing Sheets

BUS DRIVER CIRCUIT WITH IMPROVED TRANSITION SPEED

TECHNICAL FIELD

The present description relates to the field of data busses, particularly to bus nodes and bus driver circuits which are used to drive one or more bus lines of a data bus to a specific state.

BACKGROUND

Data busses are widely used to allow digital communication between two or more electronic devices, which are often referred to as bus nodes. The term "bus" usually denotes a communication system which encompasses the specification of the bus hardware as well as a communication protocol according to which the bus nodes communicate. In order to allow a large variety of users to use a specific bus, data busses are often standardized, wherein different bus standards prevail in different fields of industry. For example, in the automotive industry CAN (Controller Area Network), LIN (Lokal Interchange Network), and FlexRay are commonly used. In the field of consumer electronics USB (Universal Serial Bus) is widely used.

A bus node (i.e. an electronic device connected to the bus) usually includes a bus interface which may be an electronic circuit that accomplishes the actual transmission and reception of data to and from the bus in accordance with the appropriate bus standard. A bus driver circuit is used for implementing the data transmission on a physical level (e.g. layer 1 of the well-known OSI model). For example the driver circuit has to provide defined states at the physical connection to the bus line(s). For example, the bus driver generates a defined first voltage level (e.g. 0 volts) to transmit a binary "0" to the bus and a defined second voltage level (e.g. 12 volts) to transmit a binary "1" to the bus. Bus drivers are usually designed to provide at least one "high resistive" state to avoid problems when different bus nodes generate conflicting voltage levels at their bus interface. Sometimes tri-state bus drivers are used. However, common standardized data busses use only two states (to represent binary "0" and "1") wherein in one state (e.g. the binary "1") the voltage level (e.g. 12 volts) is applied to the bus line(s) via a resistor. This state is usually called "recessive" or "idle". A second state (e.g. the binary "0") is called "dominant" or "active"; in this state the voltage level (e.g. 0 volts) is applied to the bus line via a low-resistance current path, e.g. a closed semiconductor switch. In case one bus node generates a "dominant" ("active") state by forcing the voltage level on the bus line to 0 volts, all other bus nodes that generate a "recessive" ("idle") state are overridden. Their output is protected by the mentioned resistor.

In all bus systems the bus nodes (i.e. their bus driver circuits) have to provide an idle/recessive state and an active/dominant state in order to allow a collision-free communication. For example, in LIN or CAN systems the recessive state represents a binary "1" wherein the dominant state represents a binary "0". In FlexRay or USB systems the recessive state is usually referred to as "idle" and represents a period without communication. Although this idle state is not associated with a data bit (in FlexRay and USB systems in which both "1" and "0" are active states), transitions to the idle state are specified in the respective standards. For example, the transitions have to comply with timing requirements specified in the standard.

Bus driver circuits usually include one or more semiconductor switches which are configured to connect or disconnect the bus wire(s) with a supply potential or ground potential (either via a resistor or directly). The bus line(s), however, may also have a significant resistance and, particularly, a capacitance, which have an impact on the switching time between an active and an idle state. Consequently, the switching time does not only depend on the characteristics of the driver circuit but also one the properties of the connected bus line(s). Slow transitions to idle state are a problematic when high data rates are desired. Thus, there is a need for improved bus drivers and bus nodes.

SUMMARY

A bus driver circuit is disclosed herein. In accordance with one aspect of the invention the driver circuit includes a first and a second circuit node, wherein the first circuit node is operably coupled to a bus line, which causes a bus capacitance between the first and the second circuit node. A switching circuit is coupled to the first circuit node and configured to apply an output voltage between the first and the second circuit node. Thereby the bus capacitance is charged when a control signal indicates a dominant state. A discharge circuit comprises at least one resistor. The discharge circuit is coupled between the first and the second circuit node and configured to allow the bus capacitance to discharge via the resistor when the control signal indicates a recessive state. The switching circuit is further configured to provide, in addition to the discharge circuit, a temporary current path for discharging the bus capacitance during a transition period from a dominant to a recessive state.

BRIEF DESCRIPTION OF THE DRAWINGS

The invention can be better understood with reference to the following drawings and descriptions. The components in the figures are not necessarily to scale, in-stead emphasis is placed upon illustrating the principles of the invention. More-over, in the figures, like reference numerals designate corresponding parts. In the drawings.

DETAILED DESCRIPTION

Figure 1:
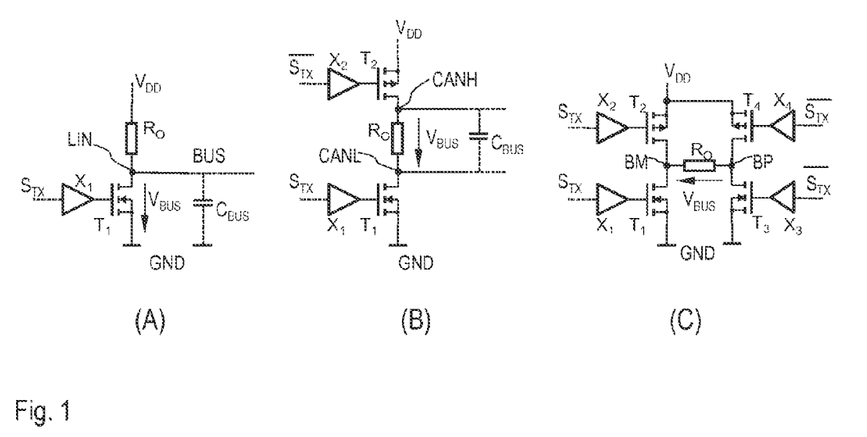
FIG. 1A is an exemplary, simplified bus driver circuit for a LIN bus system.
FIG. 1B is an exemplary, simplified bus driver circuit for a CAN bus system.
FIG. 1C is an exemplary, simplified bus driver circuit for a FlexRay bus system.

FIG. 1 illustrates different examples of bus driver circuits which are coupled to corresponding bus lines. FIG. 1A is a LIN bus driver, FIG. 1B is a CAN bus driver, and FIG. 1C is a FlexRay bus driver. The LIN bus driver of FIG. 1A includes basically a transistor $T_1$ and a resistor $R_O$ (output resistor). The load current path (e.g. the drain-source path in case of a MOSFET) of the transistor $T_1$ and the resistor $R_O$ are coupled in series. The load current path of the transistor $T_1$ is connected between a circuit node GND, which is at a reference potential (e.g. ground potential), and an output circuit node LIN, which is connected to the bus line. The resistor $R_O$ operates as a pull-up-resistor and is connected between the output circuit node LIN and a supply node SUP, at which a supply voltage $V_{DD}$ is applied. A diode (not shown) or other circuitry may be connected in series to the resistor between the output circuit node LIN and the supply node SUP. The bus line has a (parasitic) capacitance which is represented by the capacitor $C_{BUS}$ shown in FIG. 1A. The control electrode (e.g. the gate electrode in case of a MOSFET) is driven using a gate driver circuit $X_1$ which is configured to convert a binary (on/off) control signal into an appropriate gate signal to switch the transistor on and off in accordance with the binary control signal.

As can be seen from FIG. 1A, the voltage level $V_{BUS}$ present on the bus line (with respect to the reference potential) is either approximately 0 V (i.e. the reference potential, when neglecting the voltage drop across the transistor $T_1$ when switched on) or equals the supply voltage $V_{DD}$ (e.g. 12V). When switched on, the transistor $T_1$ pulls the bus voltage $V_{BUS}$ actively to ground potential (0 V) by providing a low-resistance current path between the output circuit node LIN and reference potential (ground node GND). Thus, a bus voltage $V_{BUS}$ of approximately 0 V is a dominant state associated with a "0" bit. The present LIN standard requires a bus voltage level lower than 20% of the supply voltage to signal a "0" bit and a bus voltage higher than 80% of the supply voltage $V_{DD}$ to signal a "1" bit. When the transistor $T_1$ is switched off, the bus voltage $V_{BUS}$ is pulled up to the supply voltage $V_{DD}$ by the resistor $R_O$. This state, in which the bus driver has a high output impedance, is a recessive state. The output level of the bus driver could be overridden by other bus-nodes.

Figure 2:
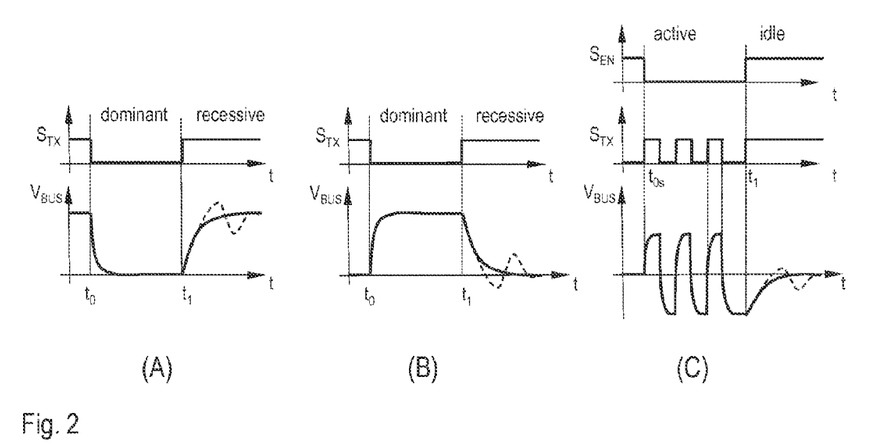
FIG. 2A includes timing diagrams illustrating the transition from a dominant state to a recessive state on a LIN bus and vice versa.
FIG. 2B includes timing diagrams illustrating the transition from a dominant state to a recessive state on a CAN bus and vice versa.
FIG. 2C includes timing diagrams illustrating the transition between different active states and from an active state to idle state on a FlexRay bus.

FIG. 2A includes timing diagrams for the binary control signal $S_{TX}$ and the resulting bus voltage $V_{BUS}$. At time instant $t_0$ the control signal changes from a high level (binary "1") to a low level (binary "0"). The gate driver generates a gate signal to switch the transistor $T_1$ on and, consequently, the bus voltage $V_{BUS}$ quickly falls to approximately 0V (the reference potential). The fall time of the bus voltage is essentially determined by the switching time of the transistor $T_1$. At time instant $t_1$ the control signal reverts to the high level, and the gate driver generates a gate signal to switch the transistor $T_1$ off Consequently, the bus voltage $V_{BUS}$ rises to approximately $V_{DD}$ (the supply voltage). The rise time is mainly determined by the resistance of the resistor $R_O$ and the capacitance $C_{BUS}$ which has to be charged via the resistor $R_O$. Dependent on the actual implementation the bus capacitance $C_{BUS}$ may contribute to a (parasitic) resonance circuit and transient oscillations (ringing) may occur (see dashed line in FIG. 2A). The transition time from the dominant (low level) into the recessive (high level) state is mainly determined by external parameters is independent from the switching time of the transistor $T_0$.

The CAN bus driver of FIG. 1B operates similarly to the LIN bus driver of FIG. 1A. However, the bus voltage is a differential signal in CAN systems. Accordingly, two bus lines are used (wherein a ground line is not needed), which are connected to the output nodes CANH and CANL of the CAN bus driver. The bus driver circuit includes basically two transistors $T_1$ and $T_2$ and a resistor $R_O$ (output resistor). The resistor $R_O$ is connected between the output nodes CANL and CANH. The load current path of transistor $T_1$ is connected between the ground terminal GND (reference potential) and the output node CANL whereas the load current path of transistor $T_2$ is connected between output node CANH and the supply circuit node, at which the supply voltage $V_{DD}$ is applied. A diode (not shown) or other circuitry may be connected in series to the resistor between the output circuit node LIN and the supply node SUP. The bus lines have a (parasitic) capacitance which is represented by the capacitor $C_{BUS}$ shown in FIG. 1B.

The control electrodes (e.g. the gate electrodes in case of MOSFETs) are driven using the gate driver circuits $X_1$ and $X_2$ which are configured to convert a binary (on/off) control signal into an appropriate gate signals to switch the transistors $T_1$ and $T_2$, respectively, on and off in accordance with the binary control signal. Alternatively a common gate driver circuit may be used for both transistors $T_1$ and $T_2$ dependent on the actual implementation. As can be seen from FIG. 1B, the (differential) voltage $V_{BUS}$ present between the bus line is either approximately 0 V, when both transistors $T_1$ and $T_2$ are switched off, or equals the supply voltage $V_{DD}$ (e.g. 12V), when both transistors $T_1$ and $T_2$ are switched on. Both transistors $T_1$, $T_2$ switch synchronously.

When switched on, the transistor $T_1$ pulls the potential of the output node CANH actively to the supply potential $V_{DD}$ by providing a low-resistance current path between the output circuit node CANH and the circuit node at which the supply voltage $V_{DD}$ is applied. Furthermore, when switched on, the transistor $T_2$ pulls the potential of the output node CANL actively to the reference potential by providing a low-resistance current path between the output circuit node CANL and the ground node which is at the reference potential. As a result, the bus voltage VBUS is approximately equal to the supply voltage $V_{DD}$. This state is a dominant state and represents a binary "1". When the transistors $T_1$ and $T_2$ are switched off, the bus output nodes CANL and CANH are isolated from the ground node GND and the supply circuit node ($V_{DD}$), respectively, and the capacitance $C_{BUS}$ discharges via the resistor $R_O$. In steady state, the capacitance CBUS is discharged resulting in a bus voltage $V_{BUS}$ of 0V. This state is a recessive state and represents a binary "0".

FIG. 2B includes timing diagrams for the binary control signal $S_{TX}$ and the resulting bus voltage $V_{BUS}$. At time instant $t_0$ the control signal changes from a high level (binary "1") to a low level (binary "0"). The gate driver generate gate signals to switch the transistors $T_1$ and $T_2$ on and, consequently, the bus voltage $V_{BUS}$ quickly rises to (approximately) supply voltage $V_{DD}$. The rise time of the bus voltage $V_{BUS}$ is essentially determined by the switching time of the transistors $T_1$ and $T_2$. At time instant $t_1$ the control signal $S_{TX}$ reverts to the high level, and the gate driver generates gate signals to switch the transistor $T_1$ and $T_2$ off Consequently, the bus voltage $V_{BUS}$ falls to approximately 0

V (the reference voltage). The fall time is mainly determined by the resistance of the resistor $R_O$ and the capacitance $C_{BUS}$ which has to be discharged via the resistor $R_O$. Dependent on the actual implementation the bus capacitance $C_{BUS}$ may contribute to a (parasitic) resonance circuit and transient oscillations (ringing) may occur (see dashed line in FIG. 2B). The transition time from the dominant (low level of control $S_{TX}$) into the recessive (high level of control signal $S_{TX}$) state is mainly determined by external parameters is independent from the switching time of the transistors $T_0$ and $T_1$.

The FlexRay bus driver of FIG. 1C operates similarly to the CAN bus driver of FIG. 1B. The bus voltage $V_{BUS}$ is a differential signal in FlexRay systems. Different to the CAN bus driver of FIG. 1B, the FlexRay bus driver is implemented as a transistor H-bridge formed by the four transistors $T_1$, $T_2$, $T_3$, and $T_4$. A first transistor half-bridge is formed by the transistors $T_1$ and $T_2$, wherein the common circuit node of the two transistors forms a first output node BP. A second transistor half-bridge is formed by the transistors $T_3$ and $T_4$, wherein the common circuit node of the two transistors forms a second output node BM. Both half-bridges are connected between the supply terminal, which is supplied with the supply voltage $V_{DD}$, and a ground terminal GND. Transistors $T_2$ and $T_4$ are high-side switches and transistors $T_1$ and $T_3$ are low-side switches. The two output nodes BP and BM are connected via an output resistor $R_O$. The bus driver is in idle (recessive) state when all transistors $T_1$ to $T_4$ are switched off. In a first active (dominant) state, the low side transistor $T_1$ and the high side transistor $T_4$ are switched on while the other two transistors are switched off. As a result, the bus voltage $V_{BUS}$ is positive and (approximately) equals the supply voltage $+V_{DD}$. In a second active (dominant) state, the low side transistor $T_3$ and the high side transistor $T_2$ are switched on while the other two transistors are switched off. As a result, the bus voltage $V_{BUS}$ is negative and (approximately) equals the inverse supply voltage $-V_{DD}$. The first active state represents a binary "1" whereas the second active state represents a binary "0".

Two bus lines are connected to the output nodes BP and BM. The bus lines have a (parasitic) capacitance which is represented by the capacitor $C_{BUS}$ (similar to FIG. 1B but not shown in FIG. 1C). In the present example, four gate driver circuits $X_1$ to $X_4$ are associated with the four transistors $T_1$ to $T_4$, respectively. Each gate driver circuit receives the control signal $S_{TX}$ (or an inverted version thereof). Each input of the gate driver circuits can be blanked (e.g. by using an enable signal $S_{EN}$ as illustrated in FIG. 2C). FIG. 2C illustrates timing diagrams of the control signal $S_{TX}$ and the enable signal $S_{EN}$. While the enable signal $S_{EN}$ is at a high level, all transistors $T_1$ to $T_4$ are switched off and the bus voltage $V_{BUS}$ across the output resistor $R_O$ is zero. Thus, the bus driver is in an idle (recessive) state. When the enable signal $S_{EN}$ changes to a low level, the bus driver changes to an active (dominant) state. Dependent on the value of the control signal $S_{TX}$ either the transistors $T_2$ and $T_3$ are switched on (while $T_1$ and $T_4$ are off) or the transistors $T_1$ and $T_4$ are switched on (while $T_2$ and $T_3$ are off).

When changing from one active state into the other active state (e.g. when $S_{TX}$ changes from "0" to "1" (or vice versa) while $S_{EN}$ is "0"), the transition time mainly depends on the switching time of the transistor H-bridge. However, when changing from an active state into the idle state (see time instant $t_1$ in FIG. 2C), the bus capacitance is discharged via the output resistor. The transition is comparably slow and independent from the switching time of the H-bridge. Dependent on the actual implementation the bus capacitance $C_{BUS}$ may contribute to a (parasitic) resonance circuit and transient oscillations (ringing) may occur (see dashed line in FIG. 2C) similar to the previous examples (LIN and CAN bus).

Having described different bus driver circuits which are able to operate in accordance with different bus standards (LIN, CAN, FlexRay) some general aspects of these bus driver circuits are summarized. A bus driver circuit has (at least) two circuit node. A first circuit node (c.f. output node LIN in FIG. 1A, output node CANL in FIG. 1B, and output node BP in FIG. 1C) of the two circuit nodes is configured to be coupled to a bus line (e.g. a LIN bus line). The bus line gives rise to a bus capacitance $C_{BUS}$ between the first and the second circuit node (e.g. the supply node SUP in FIG. 1A, the output node CANH in FIG. 1B, and the output node BM in FIG. 1C). It should be noted that, although the bus capacitance $C_{BUS}$ is illustrated between the output node LIN and the ground node GND in FIG. 1A, there is an equivalent bus capacitance between the output node LIN and the supply node SUP.

The bus drivers further include a switching circuit coupled to the first circuit node and configured to apply an output voltage between the first and the second circuit node thus charging the bus capacitance $C_{BUS}$, when a control signal indicates a dominant state. The control signal is denoted as $S_{TX}$ in FIG. 2A (LIN) and FIG. 2B (CAN) and $S_{EN}$ in FIG. 2B (FlexRay). The output voltage is denoted as $V_{BUS}$ in FIGS. 1B and 1C (CAN and FlexRay). In FIG. 1A (LIN) the output voltage between the first node (output node LIN) and the second node (supply node SUP) would be $V_{DD}-V_{BUS}$. Furthermore, the bus drivers include a discharge circuit which is composed of at least one resistor $R_O$ (and, optionally, of other circuit components). The discharge circuit is coupled between the first and the second circuit node and being configured to allow the bus capacitance $C_{BUS}$ to discharge via the resistor $R_O$, when the control signal indicates a recessive state. The discharge circuit, or parts thereof, may serve as an electrical termination (bus termination). In the present examples, the resistor $R_O$ can also be seen as a bus termination resistor.

In other words, a bus driver has two circuit node between which a defined output voltage is applied in a dominant (active) state using a switching circuit. As a result, the (parasitic) capacitance between the two circuit nodes is charged. In a recessive (idle) state, the switching circuit does not actively apply the output voltage between the two circuit nodes, and thus the mentioned capacitance can discharge via the discharge circuit (e.g. the resistor $R_O$, see FIG. 1A to 1C). As a further general statement it can be noted that the transition time from a dominant state to a recessive state is mainly determined by the bus capacitance and the parameters of the discharge network and not by the characteristics of the switching circuit.

The bus capacitance as well as the resistance of the output resistor $R_O$ are parameters which are given (e.g. by definition in the standard) and cannot readily be changed. Therefore, the transition time from a dominant (active) to a recessive (idle) state depends, e.g. on the length and the type of the bus line and which thus also limits the data rate, which is achievable with a specific bus configuration. Particularly with long bus lines the transition time to the recessive (idle) state can be comparably long.

To improve the transition time, the switching circuit is further configured to provide (in addition to the discharge circuit) a temporary current path for discharging the bus capacitance, wherein temporary is to be understood as during a transition period from a dominant to a recessive state. After the transition period (at the latest) the temporary current path is disconnected so that only the discharge circuit is effective. For example, the switching circuit may include an additional transistor which provides an additional current path (in addition to the discharge circuit) for discharging the bus capacitance. The additional current path results in a faster discharging of the bus capacitance and thus in a shorter transition period.

Figure 3:
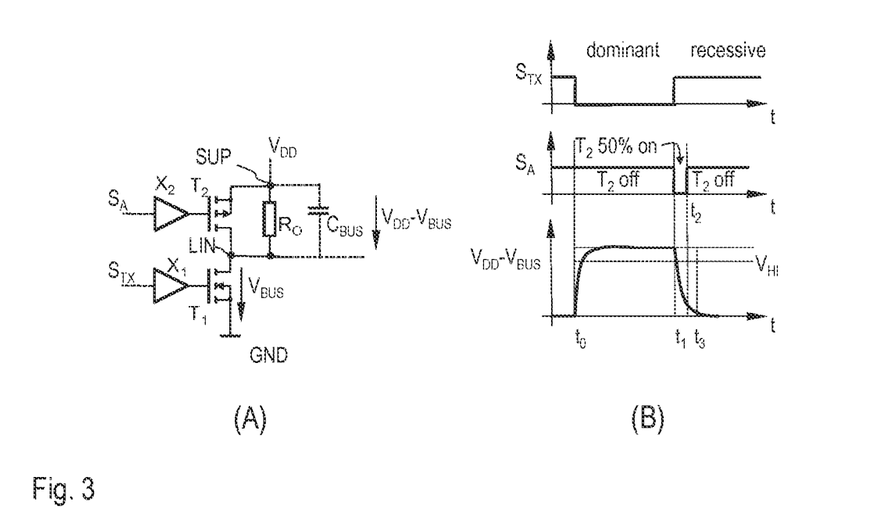
FIG. 3A is a circuit diagram illustrating a LIN bus driver in accordance with a first embodiment.
FIG. 3B includes timing diagrams illustrating the operation of the circuit of FIG. 3A.

FIG. 3A illustrates one example of an improved bus driver for use in a LIN bus node. The circuit is identical to the circuit of FIG. 1A. However, it has an additional transistor $T_2$ whose load current path (e.g. drain-source current path in case of a MOSFET) is coupled in parallel to the resistor $R_O$. Using the general terms from the above discussion, the discharge network is formed by the output resistor $R_O$ and the switching network by the transistors $T_1$ and $T_2$. By switching on the (low-side) transistor $T_1$ (while transistor $T_2$ is off) the output node LIN is actively pulled down to approximately ground potential, thus setting the voltage between the supply node SUP and the output node LIN to a voltage approximately equal to the supply voltage $V_{DD}$. As the voltage ($V_{DD}$-$V_{SUP}$) is actively applied between the nodes SUP and LIN this state is the dominant (active) state. To change into the recessive (idle) state, the transistor $T_1$ is switched off, thus the output voltage is not further actively applied to the output node LIN and the charge stored in the bus capacitance can discharge via the resistor $R_O$. During this period of discharging (transition period) the transistor $T_2$ is temporarily driven to a (partially) conductive state thus providing a current path in parallel to the resistor $R_O$ which significantly accelerates the discharging process. The transistor $T_2$ may be regarded as controllable resistor which may be continuously varied during the transition period.

FIG. 3B includes timing diagrams of the output signal $V_{DD}$-$V_{BUS}$, the binary control signal $S_{TX}$ according to which the transistor $T_1$ is driven by gate driver $X_1$, and the auxiliary control signal $S_A$ according to which the transistor $T_2$ is driven by gate driver $X_2$. On time instant $t_0$ the binary control signal $S_{TX}$ changes from a high level to a low level and thus indicates a transition to the dominant state. Accordingly, the gate driver $X_1$ generates a gate signal to switch the transistor $T_1$ on thereby applying the voltage $V_{DD}$ between the supply node SUP and the output node LIN (i.e. voltage $V_{DD}$ drops across resistor $R_O$). At time instant $t_1$, the binary control signal $S_{TX}$ changes from a low level to a high level and thus indicates a transition to the recessive state. Accordingly, the gate driver $X_1$ generates a gate signal to switch the transistor $T_1$ off. As a result, the capacitance $C_{BUS}$ is able to discharge via the resistor $R_O$. At the same time $t_1$ the auxiliary control signal $S_A$ changes from a high level to a low level to temporarily activate (via the gate driver $X_2$) the transistor $T_2$ which provides an additional current path via which the capacitance $C_{BUS}$ can discharge. After a short time interval $t_2$-$t_1$ (i.e. at time instant $t_2$) the signal $S_A$ reverts to a high level and the transistor $T_2$ is switched off again. The capacitance $C_{BUS}$ may further discharge via the resistor $R_O$ until a steady state is reached at time instant $t_3$. The gate driver $X_2$ may be configured to drive the transistor to a medium conductive state (i.e. a defined resistance) without switching to a low on-resistance. The additional current path temporarily (i.e. between time instants $t_1$ and $t_2$) reduces the effective resistance, increases the current for discharging the bus capacitance $C_{BUS}$ and thus results in a significantly shorter transition time ($t_3$-$t_1$) from the dominant state to the recessive state. The time interval $t_2$-$t_1$ may be a fixed period. Alternatively, the time instant $t_2$ may be triggered by a receiver circuit (not shown in the figures, but present in bus transceiver circuits) when detecting a bus voltage level indicating the recessive state.

Figure 4:
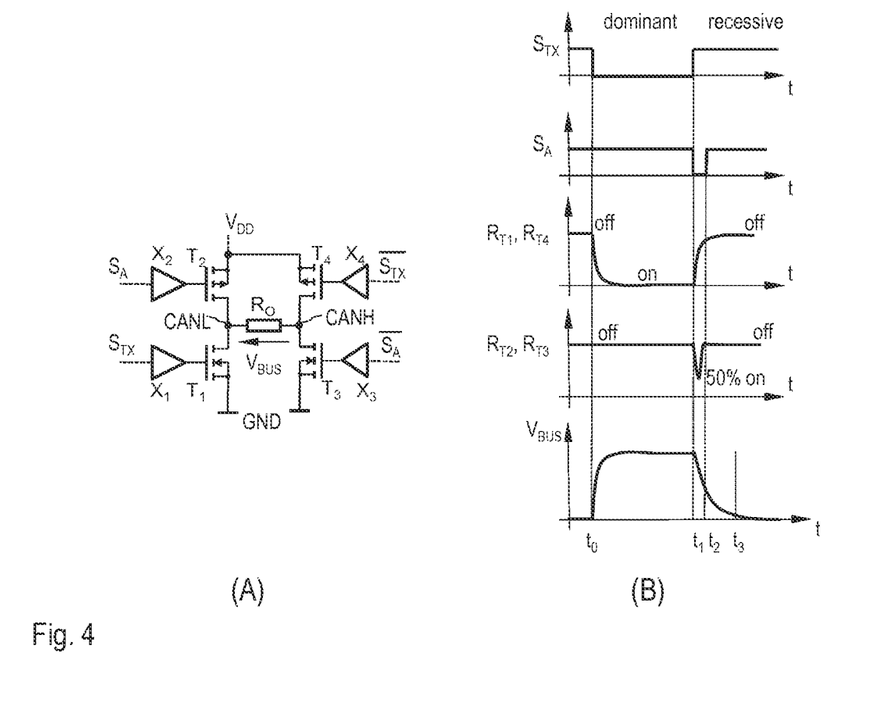
FIG. 4A is a circuit diagram illustrating a CAN bus driver in accordance with a first embodiment.
FIG. 4B includes timing diagrams illustrating the operation of the circuit of FIG. 4A.

FIGS. 4A and 4B illustrate another example of an improved bus driver for use in a CAN bus node. The circuit topology is the same as in FIG. 1C (basic FlexRay bus driver), however, the driving of the transistors of the H-bridge is different in CAN operation. Furthermore, the transistors $T_1$ and $T_4$ may have a different number of transistor cells (see also FIG. 7). The H-bridge is composed of two half-bridges, each composed of a high-side transistor, $T_2$ and $T_4$, and a low side transistor, $T_1$ and $T_3$, respectively. The middle tap of the first half-bridge ($T_1$ and $T_2$) forms the first output node CANL, and the middle tap of the second half-bridge ($T_3$ and $T_4$) forms the second output node CANH. The bus voltage $V_{BUS}$ is the voltage between the nodes CANH and CANL. In the dominant state, the transistors $T_1$ and $T_4$ are switched on, thereby applying a voltage (approximately) equal to the supply voltage $V_{DD}$ as bus voltage $V_{BUS}$ between the nodes CANH and CANL. In the recessive state, all transistors $T_1$ to $T_4$ are switched off. The each transistor $T_1$ to $T_4$ has a respective gate driver circuit $X_1$ to $X_4$ for generating appropriate gate signals in according to the control signals. The "main" transistors $T_1$ and $T_4$ are switched in accordance with the binary control signal $S_{TX}$ whereas the "auxiliary" transistors $T_2$ and $T_3$ are controlled by the auxiliary control signal $S_A$. The operation of the bus driver circuit is now discussed with reference to the timing diagrams of FIG. 4B.

FIG. 4B includes exemplary timing diagrams illustrating the binary control signals $S_{TX}$ and $S_A$, the resulting resistances $R_{T1}$, $R_{T2}$, $R_{T3}$, and $R_{T4}$ of the four transistors' load paths, and the resulting differential output voltage $V_{BUS}$. On time instant $t_0$ the binary control signal $S_{TX}$ changes from a high level to a low level and thus indicates a transition to the dominant state. Accordingly, the gate drivers $X_1$ and $X_4$ generate gate signals to switch the transistors $T_1$ and $T_4$ on thereby applying the voltage $V_{DD}$ between the output nodes CANH and CANL (i.e. voltage $V_{DD}$ drops across resistor $R_O$). During the dominant state the transistors $T_2$ and $T_3$ are off. The resistance value $R_{T1}$ and $R_{T4}$ fall from a maximum (practically non-conductive off-state) to a minimum (on-state) as the bus voltage $V_{BUS}$ rises.

At time instant $t_1$, the binary control signal $S_{TX}$ changes from a low level to a high level and thus indicates a transition to the recessive state. Accordingly, the gate drivers $X_1$ and $X_4$ generate gate signals to switch the transistors $T_1$ and $T_4$ off. The resistance values $R_{T1}$ and $R_{T4}$ again rise to the maximum resistance (off-state). As a result, the capacitance $C_{BUS}$ is able to discharge via the resistor $R_O$. At the same time $t_1$ the auxiliary control signal $S_A$ changes from a high level to a low level to temporarily activate (via the gate drivers $X_2$ and $X_3$) the transistors $T_2$ and $T_3$, respectively, which provide an additional current path via which the capacitance $C_{BUS}$ can discharge. After a short time interval $t_2$-$t_1$ (i.e. at time instant $t_2$) the signal $S_A$ reverts to a high level and the transistors $T_2$ and $T_3$ are switched off again. The capacitance $C_{BUS}$ may further discharge via the resistor $R_O$ until a steady state is reached at time instant $t_3$. The gate drivers $X_2$ and $X_3$ may be configured to drive the corresponding transistors to a medium conductive state (i.e. a defined resistance) without switching to a low on-resistance. Corresponding resistance values $R_{T2}$ and $R_{T3}$ over time are also shown in FIG. 4B. The additional current path temporarily (i.e. between time instants $t_1$ and $t_2$) reduces the effective resistance, increases the current for discharging the bus capacitance $C_{BUS}$, and thus results in a significantly shorter transition time ($t_3-t_1$) from the dominant state to the recessive state. The time interval $t_2-t_1$ may be a fixed period. Alternatively, the time instant $t_2$ may be triggered by a receiver circuit (not shown in the figures, but present in bus transceiver circuits) when detecting a bus voltage level indicating the recessive state. Other concepts of driving the transistors $T_1$ to $T_4$ on and off during the transition period from the dominant (active) state to the recessive (idle) state will be discussed later.

For a FlexRay system, the bus driver has the same topology as for a CAN system (see FIG. 4A). However, in a FlexRay system two different transitions are possible, namely from an active "0" state ($V_{BUS}=-V_{DD}$) to idle state and from an active "1" ($V_{BUS}=+V_{DD}$) to idle state. The latter case is identical to the previously discussed CAN example. In the first case, the driver circuit operates analogously, whereby the transistor-pairs $T_1$, $T_4$ and $T_2$, $T_3$ change roles. Furthermore, the FlexRay driver is composed of two identical half bridges due to the symmetric switching during transitions between active "0" state and active "1" state.

Summarizing the above, one important aspect of the described embodiments is providing a temporary current-path in addition to the output resistor $R_O$ to allow a faster discharging of the bus capacitance during the transition into a recessive (idle) state. The temporary current path is provided by temporarily activating additional transistors (e.g. $T_2$ in the case the LIN driver shown in FIG. 3A). In accordance with some embodiments the transistors are not fully switched on but rather their resistance is continuously varied (see, for example, the timing diagrams for $R_{T1}$ to $R_{T4}$ in FIG. 4B).

The resistance value of a (partially) conductive transistor may be controlled in different ways. For example, the resistance may be varied by varying the gate voltage of the transistor (or base current in case of a bipolar transistor). However, such a solution requires a comparably driver circuit with analog electronic components. As the transistors are usually composed of a plurality of individual transistor cells whose load current paths are connected in parallel, the total resistance of the transistor can be varied by activating (i.e. switching on) a varying number of transistor cells of the plurality of transistor cells. The resistance may be ramped up (or down) by sequentially activating (or deactivating) the individual transistor cells.

Figure 5:
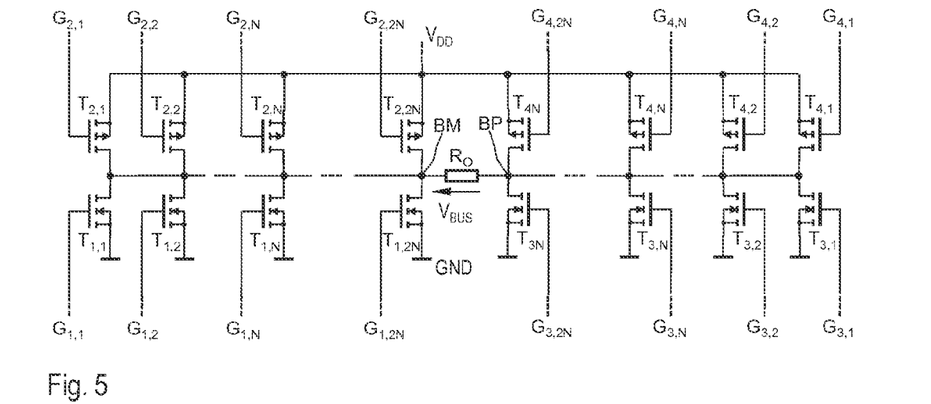
FIG. 5 is a circuit diagram illustrating a FlexRay bus driver in accordance with another embodiment.

FIG. 5 illustrates a FlexRay bus driver, in which the transistors of a H-bridge are composed of a plurality of parallel transistors that can be driven individually. In essence the driver circuit has the same topology as the driver in FIG. 1C. However, the transistors of the H-bridge are driven in a specific manner. Parallel transistors means, the load current paths of the transistors are connected in parallel whereas the gate electrodes are not necessarily connected. As can be seen from FIG. 5, the low side transistor $T_1$ of the left half-bridge is composed of a number of 2N transistor cells (or groups of cells), i.e. the individual transistors $T_{1,1}$, $T_{1,2}$, ..., $T_{1,N}$, ..., $T_{1,2N}$, each of which may be formed by one or more transistor cells. Similarly, the high side transistor $T_2$ of the left half bridge is composed of the transistors $T_{2,1}$, $T_{2,2}$, ..., $T_{2,N}$, $T_{2,2N}$, the low side transistor $T_3$ of the right half-bridge is composed of the transistors $T_{3,1}$, $T_{3,2}$, ... $T_{3,N}$, $T_{3,2N}$, and the high side transistor $T_4$ of the right half bridge is composed of the transistors $T_{4,1}$, $T_{4,2}$, ..., $T_{4,N}$, $T_{4,2N}$. The common circuit node between the transistors $T_1$ and $T_2$ is denoted as output node BM, and the common circuit node between the transistors $T_3$ and $T_4$ is denoted as output node BP. The bus lines are connected to these output nodes BM, BP and the output resistor RO is connected between the output nodes BM, BP. The differential bus voltage $V_{BUS}$ is the voltage drop between the node BM and BP. For signaling a 0-bit (active state) on the bus (corresponds to $V_{BUS}=-V_{DD}$) the transistors $T_2$ and $T_3$ are switched on, while transistors $T_1$ and $T_4$ are switched off. Conversely, for signaling a 1-bit (active state) on the bus (corresponds to $V_{BUS}=+V_{DD}$) the transistors $T_1$ and $T_4$ are switched on, while transistors $T_2$ and $T_3$ are switched off. In the idle state, all four transistors of the H-bridge are switched off. These conditions are valid in steady state, wherein "transistor $T_1$ is switched on" means that all parallel transistor cells (or groups of cells) $T_{1,1}$, $T_{1,2}$, ..., $T_{1,2N}$ are switched on. During transitions between the states (active 0, active 1, and idle), more complex switching operations may be performed. It should be noted that, in the present example the high side transistors $T_2$ and $T_4$ are p-channel MOSFETs and the low side transistors $T_1$ and $T_3$ are n-channel MOSFETs. Consequently, the n-channel MOSFETs $T_1$ and $T_3$ are switched on by applying a high-level gate signal, whereas the p-channel MOSFETs $T_1$ and $T_3$ are switched on by applying a low-level gate signal. The gate signals (provided by appropriate gate driver circuitry) are denoted as $G_{ij}$ for each individual transistor cell $T_{ij}$ (or group of transistor cells), wherein $i=\{1, 2, 3\ 4\}$ and $j=\{1, 2, ..., 2N\}$.

Figure 6:
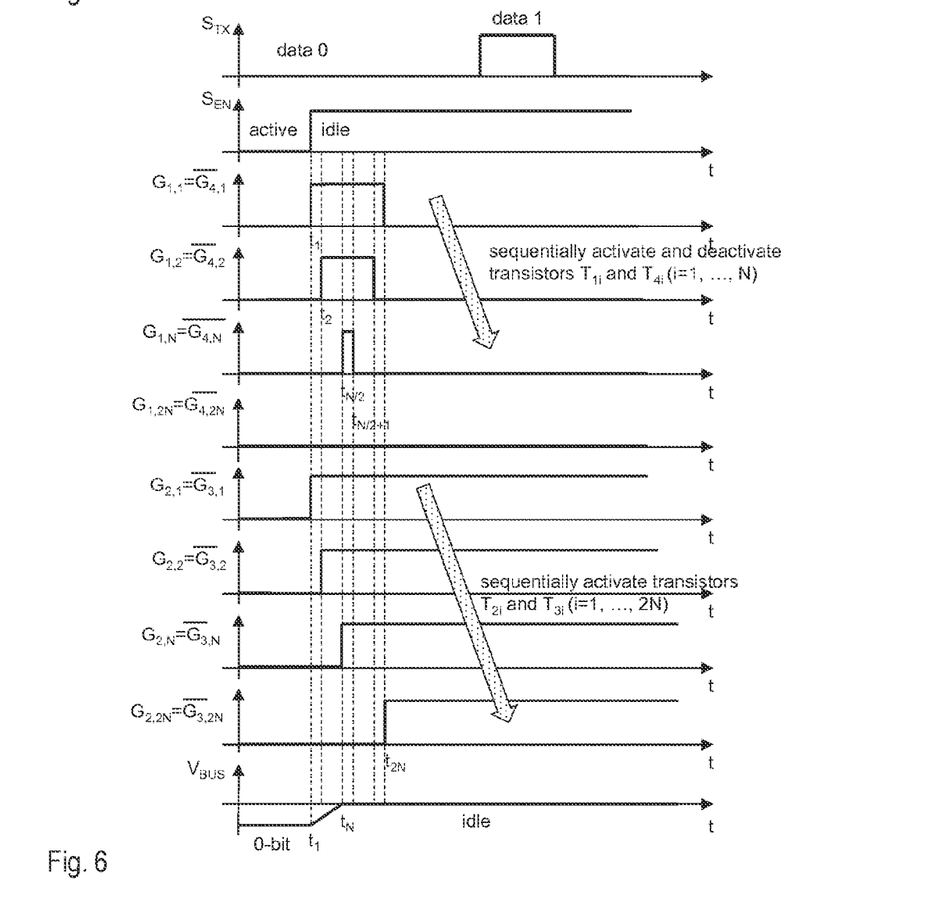
FIG. 6 includes timing diagrams illustrating the function of the circuit of FIG. 5.

FIG. 6 includes timing diagrams for various signals waveforms illustrating the function of the circuit of FIG. 5. Particularly, the timing diagrams illustrate, as one example, a transition from an active state (active 0) to the idle state of a FlexRay bus. The timing diagrams are numbered top-down. The first diagram illustrates an exemplary waveform of the binary input signal $S_{TX}$ wherein a high level represents a 1-bit and a low level represents a 0-bit. The second diagram illustrates an exemplary waveform of the enable signal $S_{EN}$ wherein a high level represents the idle state (in which no data can be sent) and a low level represents an active state (in which either a 0-bit or a 1-bit can be sent. The third to the sixth diagram illustrate the gate signals for the low side transistor $T_1$ (i.e. gate signals $G_{1,1}$, $G_{1,2}$, ... $G_{1,N}$, ..., $G_{1,2N}$) and the high side transistor $T_4$ (i.e. gate signals $G_{4,1}$, $G_{4,2}$, ... $G_{4,N}$, ..., $G_{4,2N}$). The seventh to the tenth diagram illustrate the gate signals for the high side transistor $T_2$ (i.e. gate signals $G_{2,1}$, $G_{2,2}$, ... $G_{2,N}$, ..., $G_{2,2}$N) and the low side transistor $T_3$ (i.e. gate signals $G_{3,1}$, $G_{3,2}$, ... $G_{3,N}$, $G_{3,2N}$). The eleventh diagram illustrates the resulting bus voltage $V_{BUS}$.

At times before time instant $t_1$ the enable signal $S_{EN}$ indicates an active state and the binary input signal $S_{TX}$ indicates a 0-bit. Consequently, the transistors $T_1$ and $T_4$ are off (gate signals $G_{1,j}$ are low and gate signals $G_4$j are high, for $j=\{1, 2, ..., 2N\}$) while the transistors $T_2$ and $T_3$ are on (gate signals $G_{2,j}$ are low and gate signals $G_3$j are high, for $j=\{1, 2, ..., 2N\}$). The resulting bus voltage $V_{BUS}$ approximately equals the supply voltage $-V_{DD}$. At time instant $t_1$, the enable signal changes to a high level thereby initiating a transition from the active (0-bit) state to the idle state, in which—after the transition is accomplished—all transistors are off. Triggered by the transition in signal $S_{EN}$, the transistor $T_2$ and $T_3$ are switched off. The individual transistors cells (or groups of cells) $T_{2,j}$ and $T_{3,j}$ (with $j=\{1, 2, ..., 2N\}$) are switched off sequentially, e.g. one by one, thereby step by step ramping up the effective on-resistance of the total transistor $T_2$ and $T_3$. In the present example, the gate signals $G_{2,1}$ is set to a high level (and $G_{3,1}$ to a low level) at the time instant $t_1$ thus switching off transistor cells $T_{2,1}$ and $T_{3,1}$. At time instant $t_2$ (i.e. a delay time $T_{DEL}$ later) the gate signals $G_{22}$ is set to a high level (and $G_{32}$ to a low level) for switching off transistor cells $T_{2,2}$ and $T_{3,2}$. At time instant $t_N$ 50 percent of the cells of the transistors $T_2$ and $T_3$ are switched off. At time instant $t_2N$ 100 percent of the cells of the transistors $T_2$ and $T_3$ are switched off. According to the present example, the transistor cells $T_{2,j}$ and $T_{3,j}$ (j={1, 2, ..., 2N}) are switched off in equidistant time intervals $T_{DEL}$. That is, $t_2-t_1=t_{N+1}-t_N=t_{2N}-t_{2N-1}=T_{DEL}$. Thus the effective resistance of the load current paths of the transistors is continuously ramped up, wherein both transistors $T_2$ and $T_3$ have 50 percent conductivity at time instant $t_N$.

While the transistors $T_2$ and $T_3$ are gradually switched off, the transistors $T_1$ and $T_4$ are temporarily switched on (at least partially) to provide a temporary current path for discharging the bus capacitance $C_{BUS}$ (between nodes BP and BM) during the transition period (time instant $t_1$ to $t_2N$) from the active state (active 0-bit) to the idle (recessive) state. Triggered by the transition in signal $S_{EN}$, the transistors $T_1$ and $T_4$ are gradually switched on (partially) and off again. The individual transistors cells (or groups of cells) $T_{1,j}$ and $T_{4,j}$ (with j={1, 2, ..., N}) are switched on sequentially, e.g. one by one, thereby step by step ramping up the effective on-resistance of the total transistors $T_1$ and $T_4$, wherein the a maximum of N transistor cells are switched on at the time instant $t_N$ (i.e. only half of the cells). Beginning from time instant $t_{N+1}$ the transistor cells are sequentially switched off again in a reversed order, so that the transistors $T_1$ and $T_4$ (as well as $T_2$ and $T_3$) are completely off after time instant $t_N$.

As can be concluded from the above explanation, all transistors are approximately half-conductive at time instant $t_N$. In each transistor $T_1$ to $T_4$ about half (i.e. N) of the transistor cells (or group of cells) are switched on. As a consequence, both output nodes BM and BP are actively pulled towards a potential of $V_{DD}/2$ (common mode) resulting in a differential bus voltage $V_{BUS}$ of zero volts. As the transistors $T_1$ and $T_4$ provide an additional current path (temporarily during the transition period from $t_1$ to $t_2N$) for discharging the bus capacitance $C_{BUS}$, the overall time period necessary for the transition from an active state to the idle state is significantly shortened.

It should be noted that, when the data signal $S_{TX}$ changes to a high level at a time instant $t_x$, this has no impact on the switching state of the H-bridge as the enable signal $S_{EN}$ still indicates an idle (recessive) state. That is, the signal $S_{TX}$ is blanked by the enable signal $S_{EN}$.

Figure 7:
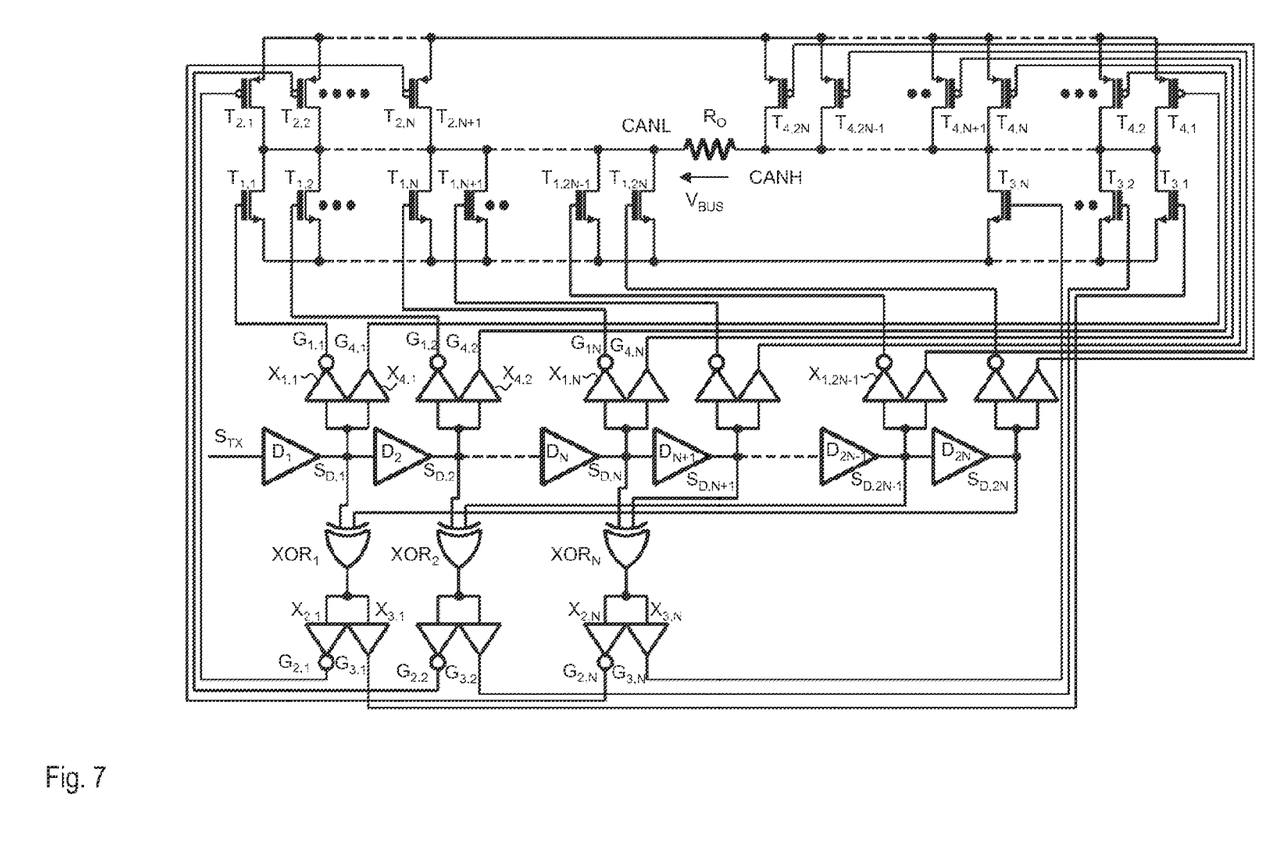
FIG. 7 is a circuit diagram illustrating a CAN bus driver in accordance with a further embodiment.

FIG. 7 illustrates a bus driver similar to the example of FIG. 5. However, as the driver circuit is configured as a CAN bus driver (whereas FIG. 5 illustrates a FlexRay driver), the number of transistor cells and the switching scheme is slightly different. The basic operation of the CAN bus driver has already been discussed above with respect to FIGS. 1B, 2B and 4. The present example uses a staggered driving (activation and deactivation) of transistor cells (or group of cells) of the transistors $T_1$ to $T_4$ to ramp up and down the effective resistance of the transistors. Similar to the FlexRay driver of FIG. 5, the transistors $T_1$ and $T_4$ are composed of a number of 2N transistor cells (or group of cells), referred to as $T_{1,1}, T_{1,2}, \ldots, T_{1,N}, T_{1,N+1}, \ldots, T_{1,2N-1}$, and $T_{4,1}, T_{4,2}, \ldots, T_{4,N}, T_{4,N+1}, \ldots, T_{4,2N-1}, T_{4,2N}$. The corresponding gate signals are denoted as $G_{1,1}, G_{1,2}, \ldots, G_{1,N}, G_{1,N+1}, \ldots, G_{1,2N-1}, G_{1,2N}$, and $G_{4,1}, G_{4,2}, \ldots, G_{4,N}, G_{4,N+1}, \ldots, G_{4,2N-1}, G_{4,2N}$, respectively. In essence, the four transistors form a H-bridge as discussed with reference to FIG. 4, wherein the bus lines are connected to the middle taps CANL and CANH of the two corresponding half-bridges, which form the H-bridge.

In the dominant state (associated with an "1" bit), the transistors $T_1$ and $T_4$ are (fully) switched on, wherein the transistors $T_2$ and $T_3$ are (fully) switched off. In the recessive state (associated with a "0" bit), all transistors $T_1$ to $T_4$ are switched off, and the bus lines are only connected via the resistor $R_O$. Similar to the previous example of FIG. 5, an additional, temporary current path is provided by activating (in a staggered manner) the transistor cells (or groups of cells) of the transistors $T_2$ and $T_3$, while switching from the dominant to the recessive state. The same switching scheme may be, however, be applied in a reverse manner to switch from the recessive into the dominant state. It should be noted that in the present case of a CAN driver, the transistors $T_2$ and $T_3$ only need to be half of the size (e.g. have half of the transistor cells) as compared with the transistors $T_1$ and $T_4$. Consequently, the transistors $T_2$ and $T_3$ are composed of a number of N transistor cells (or group of cells), referred to as $T_{2,1}, T_{2,2}, \ldots, T_{2,N}$, and $T_{3,1}, T_{3,2}, \ldots, T_{3,N}$. The corresponding gate signals are denoted as $G_{2,1}, G_{2,2}, \ldots, G_{2,N}$, and $G_{3,1}, G_{3,2}, \ldots, G_{3,N}$, respectively. Details of the switching scheme will be discussed further below with respect to FIG. 8.

To accomplish the staggered activation and deactivation of the transistors, the binary input signal $S_{TX}$ (see FIG. 1B and FIG. 4A), which indicates the desired bus state (dominant or recessive), is delayed using a chain composed of 2N delay elements $D_1, D_2, \ldots, D_N, D_{N+1}, \ldots, D_{2N-1}, D_{2N}$, each delay element forwards the input signal to its output with a delay of $t_{DEL}$. The delayed input signals are referred to as $S_{D,1}, S_{D,2}, \ldots, S_{D,N}, S_{D,N+1}, \ldots, S_{D,2N-1}, S_{D,2N}$. The gate signals supplied to the transistor cells of the transistors $T_1$ to $T_3$ are generated from the delayed input signals (or a logic combination thereof, see gates $XOR_1$ to $XOR_N$) using the gate drivers $X_{1,k}, X_{3,m}$ and inverting gate drivers $X_{4,k}, X_{2,m}$ (k=1, ..., 2N, and m=1, 2, ... N). The resulting switching scheme is shown in FIG. 8.

Figure 8:
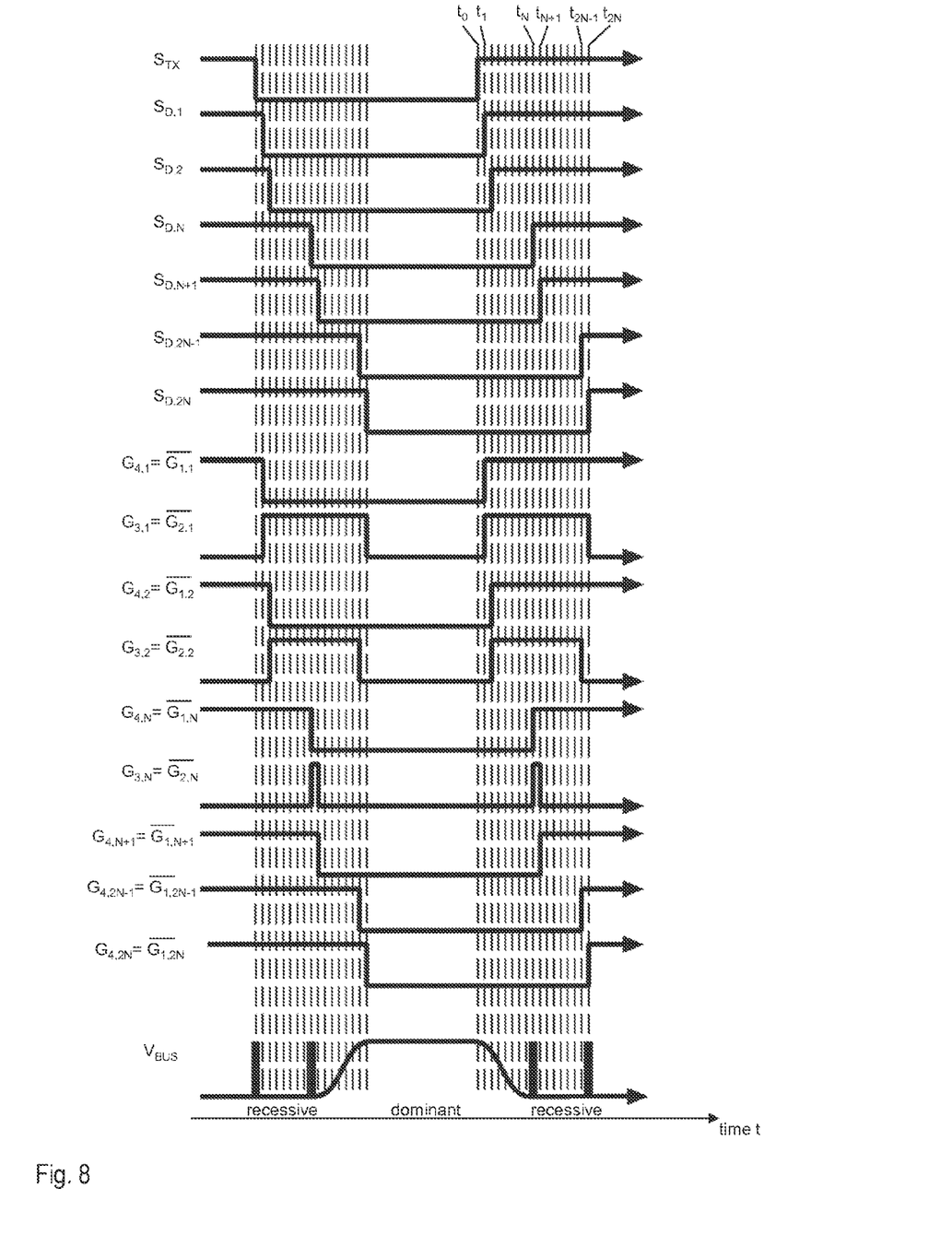
FIG. 8 includes timing diagrams illustrating the function of the circuit of FIG. 7.

FIG. 8 includes seventeen timing diagrams of the binary input signals $S_{TX}$, the delayed input signals $S_{D,k}$ (k=1, 2, ..., N, ..., 2N), the gate signals, and the bus voltage $V_{BUS}$. In the present example, the binary input signal $S_{TX}$ changes from a low level (indicating a dominant state or "1" bit) to a high level (indicating a recessive state or "0" bit) at time $t_0$. The waveform of the delayed input signals $S_{D,1}, \ldots, S_{D,2N}$, is identical to the waveform of the signal $S_{TX}$ but delayed by an integer multiple of the delay time $t_{DEL}$. That is, the corresponding transition in the delayed signal $S_{D,k}$ occurs at time instant $t_k$ (k=1, 2, ..., 2N) which is a delay time $k \cdot t_{DEL}$ after time $t_0$. The respective waveforms are illustrated in the first seven diagrams (from the top). At time instant $t_1$ the transistors $T_1$ and $T_4$ start to switch off in a staggered manner. That is, transistor cell $T_{4,1}$ is switched off at time instant $t_1$ by gate signal $G_{4,1}$ (triggered by the delayed input signal $S_{D,1}$); transistor cell $T_{4,2}$ is switched off at time instant $t_2$ by gate signal $G_{4,2}$ (triggered by the delayed input signal $S_{D,2}$); transistor cell $T_{4,N}$ is switched off at time instant $t_N$ by gate signal $G_{4,N}$ (triggered by the delayed input signal $S_{D,N}$); etc. The cells of transistor $T_1$ switch analogously. At time instant $t_2N$ the last cells of transistors $T_1$ and $T_4$ are switched off.

While the transistors $T_1$ and $T_4$ switch off, the bus capacitance $C_{BUS}$ (see FIG. 1B) is discharged via the resistor $R_O$ and the additional current path provided by transistors $T_2$ and $T_3$ which are temporarily switched on and off in a staggered manner. Accordingly, transistor cells (or groups of cells) $T_{2,1}$ and $T_{3,1}$ are switched on at time $t_1$ and switched off again at time $t_2N$ by the gate signals $G_{2,1}$ and $G_{3,1}$; transistor cells (or groups of cells) $T_{2,2}$ and $T_{3,2}$ are switched on at time $t_2$ and switched off again at time $t_{2N-1}$ by the gate signals $G_{2,1}$ and $G_{3,1}$, etc. From time instant $t_N$ to time instant $t_{N+1}$ all N cells or transistor $T_2$ and $T_3$ are switched on. At the same time half of the 2N cells (i.3. also N cells or groups of cells) of the transistors $T_1$ and $T_4$ are switched on. Due to this symmetric switching state at time $t_N$, the bus voltage $V_{BUS}$ is quickly reduced to zero (and the bus capacitance discharged) before the auxiliary transistors T2 and T3 are switched off again. It should be noted, that the same switching scheme may be used in a reversed manner for switching from the recessive state into the dominant state. Although switching speed is not an issue when switching from the recessive to the dominant state, the signal shape during the transition may be more reliably set in the presence of noise when using such a staggered switching scheme.

Although various exemplary embodiments of the invention have been disclosed, it will be apparent to those skilled in the art that various changes and modifications can be made that will achieve some of the advantages of the invention without departing from the spirit and scope of the invention. It will be obvious to those reasonably skilled in the art that other components performing the same functions may be suitably substituted. For example inverted logic levels may be used, obtaining essentially the same result. It should be mentioned that features explained with reference to a specific figure may be combined with features of other figures, even in those where not explicitly been mentioned. Furthermore, the methods of the invention may be achieved in either all software implementations using the appropriate processor instructions or in hybrid implementations that utilize a combination of hardware logic and software logic to achieve the same results. Such modifications to the inventive concept are intended to be covered by the appended claims.

We claim:

1. A bus driver circuit comprising:
 a first circuit node and a second circuit node, the first circuit node operably coupled to a bus line causing a bus capacitance between the first circuit node and the second circuit node;
 a switching circuit coupled to the first circuit node and configured to apply an output voltage between the first circuit node and the second circuit node thus charging the bus capacitance, when a control signal indicates a dominant state;
 a discharge circuit comprising at least one resistor, the discharge circuit being coupled between the first circuit node and the second circuit node and being configured to allow the bus capacitance to discharge via the resistor, when the control signal indicates a recessive state,
 wherein the switching circuit is further being configured to provide, in addition to the discharge circuit, a temporary current path for discharging the bus capacitance during a transition period from a dominant to a recessive state.

2. The bus driver circuit of claim 1, wherein the second circuit node is a supply node receiving a supply voltage; the first circuit node forming a driver output to allow single-ended signaling via the bus.

3. The bus driver circuit of claim 1, wherein the first node is coupled to a first bus line and the second node is coupled to a second bus line; the first circuit node and the second node forming a driver output to allow differential signaling via the bus lines.

4. The bus driver circuit of claim 1, wherein the switching circuit comprises at least one first transistor coupled to the first circuit node and configured to apply the output voltage at the first circuit node in accordance with the control signal.

5. The bus driver circuit of claim 1, wherein the switching circuit comprises at least one first transistor coupled to the first circuit node and at least one second transistor coupled to the second circuit node; the first transistor and the second transistor being configured to apply the output voltage between the first and the second circuit node in accordance with the control signal.

6. The bus driver circuit of claim 1, wherein the switching circuit includes at least one third transistor which is coupled to the first circuit node; the temporary current path being formed by the third transistor, which is configured to be temporarily activated in accordance with the control signal.

7. The bus driver circuit of claim 6, wherein the at least one third transistor is composed of a plurality of transistor cells, or groups of transistor cells, having load current paths coupled in parallel to form the third transistor's load current path, which has an effective resistance;
 the transistor cells, or groups of transistor cells, being configured to be sequentially switched or off, such that the effective resistance of the third transistor depends on the number of transistor cells, or groups of transistor cells, which are switched on.

8. The bus driver circuit of claim 7, wherein each transistor cell, or each group of transistor cells, is configured to be switched on and off in accordance with a gate signal, each gate signal being generated based on a delayed version of the control signal.

9. The bus driver circuit of claim 1, wherein the switching circuit comprises a transistor half-bridge having a low-side transistor and a high-side transistor;
 the high-side transistor being coupled between the first circuit node and the second circuit node, which is a supply node;
 the low-side transistor being coupled between the first circuit node and a further supply node supplied with a reference potential;
 the high-side transistor being configured to be temporarily switched on to provide the temporary current path for discharging the bus capacitance during a transition period from a dominant to a recessive state.

10. The bus driver circuit of claim 9,
 wherein both, the high-side transistor and the low-side transistor, comprise a plurality of transistor cells, or groups of parallel transistor cells, having load paths coupled in parallel and form a load path of the respective transistor; and
 wherein the transistor cells, or groups of transistor cells, are configured to be sequentially switched or off, such that the effective resistance of the respective transistor depends on the number of transistor cells, or groups of transistor cells, which are switched on.

11. The bus driver circuit of claim 10 wherein the effective resistance is equal at a specific time instant during the transition from the dominant to the recessive state.

12. The bus driver circuit of claim 10 wherein the low-side transistor has a number of 2N transistor cells, or groups or parallel transistor cells, and the high-side transistor has a number of N transistor cells, or groups or parallel transistor cells; N being a positive integer number.

13. The bus driver circuit of claim 1, wherein the switching circuit comprises a transistor H-bridge composed of a first transistor half bridge and a second transistor half bridge, each having a low-side transistor and a high-side transistor connected at a middle tap of the respective half-bridge.

14. The bus driver of claim 13,
wherein the first transistor half bridge and the second transistor half-bridge are coupled between a first supply node and a second supply node;
wherein the first supply node is the middle tap of the first transistor half bridge and the second supply node is the middle tap of the second transistor half bridge;
the high-side transistor of the first transistor half bridge and the low-side transistor of the second transistor half bridge being configured to be temporarily switched on to provide the temporary current path for discharging the bus capacitance during a transition period from a dominant to a recessive state.

15. The bus driver circuit of claim 14,
wherein the high-side transistors and the low-side transistors of the first transistor half bridge and the second transistor half-bridge, comprise a plurality of transistor cells, or groups of parallel transistor cells, having load paths coupled in parallel and form a load path of the respective transistor; and
wherein the transistor cells, or groups of transistor cells, are configured to be sequentially switched or off, such that the effective resistance of the respective transistor depends on the number of transistor cells, or groups of transistor cells, which are switched on.

16. The bus driver circuit of claim 15,
wherein, during a transition from the dominant to the recessive state, the high-side transistor of the first transistor half bridge and the low side transistor of the second transistor half bridge are synchronously switched off by sequentially switching off the transistor cells, or group of transistor cells, of the respective transistors; and
wherein, the low-side transistor of the first transistor half bridge and the high-side transistor of the second transistor half bridge are synchronously switched on and off by sequentially switching on and off the transistor cells, or group of transistor cells, of the respective transistors, such that at a specific time instant during the transition from the dominant to the recessive state the high side transistors and the low side transistors of the first transistor half bridge and second transistor half-bridge have substantially the same effective resistance.

17. The bus driver of claim 16, wherein the low-side transistor of the first transistor half bridge and the high-side transistor of the second transistor half bridge are sequentially switched on before that specific time instant and sequentially switched off after the specific time instant.

* * * * *